United States Patent [19]

Leblanc et al.

[11] Patent Number: 4,594,257

[45] Date of Patent: Jun. 10, 1986

[54] PRODUCT AND PROCESS USING COLLOIDAL PARTICLES FOR PRODUCING AN AGGLOMERATED INSTANT COFFEE HAVING A ROAST AND GROUND APPEARANCE

[75] Inventors: Yvon N. Leblanc, Ste-Martine, Canada; Valery B. Zemelman, Wilton, Conn.; Gary L. Burgess, Ridgefield, N.J.

[73] Assignee: General Foods Corporation, White Plains, N.Y.

[21] Appl. No.: 710,348

[22] Filed: Mar. 11, 1985

[51] Int. Cl.$^4$ .............................................. A23F 5/38
[52] U.S. Cl. .................................. 426/594; 426/285; 426/388; 426/453
[58] Field of Search ............... 426/453, 594, 388, 285

[56] References Cited

U.S. PATENT DOCUMENTS

| 2,977,203 | 3/1961 | Sienkiewicz et al. | 23/313 |
| 3,554,760 | 12/1967 | Sienkiewicz et al. | 99/71 |
| 3,716,373 | 2/1973 | Rhodes et al. | 99/71 |

FOREIGN PATENT DOCUMENTS

| 924173 | 4/1973 | Canada | 426/453 |
| 1111366 | 4/1968 | United Kingdom | 426/453 |
| 1276437 | 6/1970 | United Kingdom . | |
| 2006630 | 2/1972 | United Kingdom . | |
| 1267930 | 3/1972 | United Kingdom | 426/453 |

*Primary Examiner*—Joseph Golian
*Attorney, Agent, or Firm*—Joseph T. Harcarik; Thomas R. Savoie; Daniel J. Donovan

[57] ABSTRACT

A process for producing an agglomerated instant coffee product having a roasted and ground appearance comprising;
a. milling spray-dried instant coffee to produce a milled powder of an average particle size of 30 to 75 microns;
b. adding colloidal particles to the powder so that it will bind together with slight compaction;
c. forming a regular shaped, loosely bound, structurally intact cluster from the powder with colloidal particles added, said cluster have a size of 800 to 2100 microns;
d. fusing the outer surface of the cluster to a depth of from 5 to 30 microns; and
e. drying and screening the fused clusters to produce an agglomerated instant coffee having a density of from 0.20 to 0.28 gms/cc, a hardness value of less than 8, a color of 17 to 24 Lumetron units and an average agglomerate size of from 800 to 1,300 microns.

When this process is employed, an agglomerate instant coffee is produced at commercially acceptable rates which has a dark color, a fused surface and a size giving the appearance of roasted and ground coffee. Furthermore, the product has a light density yielding about one cup of coffee per teaspoon of instant coffee.

21 Claims, No Drawings

PRODUCT AND PROCESS USING COLLOIDAL PARTICLES FOR PRODUCING AN AGGLOMERATED INSTANT COFFEE HAVING A ROAST AND GROUND APPEARANCE

TECHNICAL FIELD

The invention relates to a novel process for agglomerating an instant soluble coffee to achieve a final agglomerated product which has the appearance of roast and ground coffee.

BACKGROUND ART

Since agglomeration was first introduced, there have been many attempts to produce an agglomerated coffee product which has a roast and ground appearance. Such an appearance would have a beneficial impact on the consumer who equates the appearance of roast and ground coffee with the taste and quality of freshly brewed coffee. The product must, however, satisfy other criteria to be acceptable to the consumer. For example the product must have sufficient bulk density to produce about one cup of coffee per teaspoon of product. If the product is too dense, then too strong a cup of coffee will result and if the product is not dense enough the coffee will be too weak. The product must also possess sufficient structural strength so as not to produce a large number of fines and the product must have a dark pleasing look and suitably will have a varicolored appearance. Furthermore, the product must be rapidly soluble without producing foam and the product should be of about the same size distribution of roasted and ground coffee. In addition, for the product to be commercially feasible, the product must be capable of being prepared at commercially acceptable rates.

An effort directed to agglomerating instant coffee is U.S. Pat. No. 2,977,203 issued to Sienkiewicz et al. entitled "Agglomerating Process" which is typical of the early teachings in the soluble coffee agglomeration field. The patent describes an agglomerating procedure whereby a plane of discretely arranged powder particles which are moving in a first direction preferably in the form of a falling curtain are contacted by a jet of steam, thereby redirecting the particles. As the particles in the curtain enter the path of the jet of steam, they immediately become wetted. By being directed in the path of the jet of steam, they are caused to contact one another. The opportunity for contact or collision results in a greater percentage of agglomeration. The turbulence created by the jet of steam allows a maximal opportunity for collision or contact of the wetted particles. U.S. Pat. No. 3,554,760 to Sienkiewicz et al. is an improvement of the above-described patent involving the use of upper and lower jets of steam which impinge against the falling curtain of powder. The upper jets of steam form agglomerates of varying size, density, and moisture content; the lower jets act to further wet the agglomerates and render them more uniform in density, size, and moisture content. This process, however, produces an irregular, jumbled agglomerate mass which does not have the surface appearance of roasted and ground coffee.

On the other hand, U.S. Pat. No. 3,716,373 issued to Rhodes et al. teaches a process for producing an instant coffee composition in the form of a free-flowing soluble agglomerated powder which comprises milling soluble coffee particles and forming clusters therefrom by feeding the milled particles into a vibrating distributor box. A sufficient depth of milled particles are maintained in the box, such that the particles are substantially compacted and form the desired clusters on release from the box. The resulting clusters are fed into a zone where they are moistened and heated thereby forming an agglomerated granular powder which is then dried; agglomerated powders having a bulk density of from 0.25 to 0.40 grams per cc and a color of from 28 to 40 Lumetron Units are then produced. Thus, this product is dense and relatively light in color.

British Pat. No. 1,276,437 in the name of Rhodes and Clark teaches an improvement in this above-identified process; the agglomerate produced by this improved process can have a lower bulk density range if the feed material, likewise, has a lower density than the normal spray-dried coffee powder which was used in the process described in U.S. Pat. No. 3,716,373. The British patent to Rhodes et al. talks of drying a foamy product to produce a feed material which has a bulk density before milling of 0.05 to 0.18 grams per cc at a residual moisture content of from 2 to 7% by weight; the agglomerate is said to have a bulk density of from 0.22 to 0.34 grams per cc, a color of from 28 to 50 Lumetron Units and a hardness less then 10. This product is thus light in color.

Still another process is that set forth in the British Pat. No. 2,006,603 issued to Morgan et al. teaching a coffee product consisting of free-flowing agglomerates which comprise soluble coffee particles and finely ground roasted coffee, the finely ground roasted coffee being present in an amount of from 2 to 20% by weight. A product with a roasted and ground appearance is not described.

While the coffee art is thus replete with numerous examples of ways to agglomerate coffee products, there is still a need for a process of producing an agglomerated instant coffee which will result in a product possessing a truly roast and ground coffee appearance while at the same time having an acceptable density, be sufficiently strong, have suitable dark color appearance, and be produceable at commercially acceptable rates.

SUMMARY OF THE INVENTION

This invention relates to a process for preparing an agglomerated instant coffee product having a roasted and ground appearance. Spray-dried instant coffee is milled to produce a powder of an average particle size of 30 to 75 microns with a standard deviation of from 35% to 75%. From 1 to 15 weight percent roast and ground colloidal coffee particles are added to the powder before or after milling. Next the powder with colloidal particles is formed into regular shaped, loosely bound, structurally intact clusters. The clusters have a size of from 800 to 2100 microns. The outer surface of the clusters are fused to a depth of from 5 to 30 microns and the clusters are then dried and screened to produce an agglomerated instant coffee product having a density of from about 0.20 to 0.28 gms/ cc, a hardness value of less than 8, a color of 17 to 24 Lumetron units and an average agglomerate size of from 800 to 1,300 microns.

When this process is employed, an agglomerate instant coffee is produced at commercially acceptable rates which has a dark and varied color, a fused surface and a size giving the appearance of roasted and ground coffee. Furthermore, the product has a light density yielding about one cup of coffee per teaspoon of instant coffee and is rapidly soluble in water.

DETAILED DESCRIPTION OF THE INVENTION

In order to achieve an agglomerate with the proper product attributes, spray-dried instant coffee is milled to an average particle size of from about 30 to about 75 microns and preferably from 35 to 65 microns with a size standard deviation of 35% to 75%. Suitably an Elzone brand size measuring device may be used to determine size. The mill used preferably should be combined with an air classifier which will produce size particles with a minimum degree of variation from this desired micron size. The air classified powder will have a size standard deviation of 35% to 55% and preferably 40% to 50%. The spray-dried product is produced from extracts of 20 to 65% soluble solids. Spray-dried product resulting from lower concentration of extracts are generally hollow spheres having a diameter of about 150 to 300 microns with a wall thickness of about 4 to 30 microns. When these spheres are milled, they produce platelet shaped particles. Spray-dried material produced from higher extract concentrations generally yield porous irregular shaped particles. The size of these particles are about 60 to 100 microns. When these irregular shaped particles are milled they produce cubical shaped particles. Cubical particles tend to form less dense clusters.

After milling, the powder may be cooled to a temperature of from 40° to 70° F. Cooling aids in producing a darker final product. An example of equipment which will accomplish this cooling is a Rotex brand cooler. With this equipment the powder is channeled through the unit and is indirectly cooled by a circulating liquid medium which may be water or preferably propylene glycol. Other means for cooling the powder will be readily apparent to those skilled in the art.

Up to 40 percent by weight of unmilled spherical soluble coffee material may be added to the milled material. The unmilled spherical coffee materials include unmilled, spray-dried instant coffee (reseed). These unmilled powders have a size range of from about 5 to 280 microns but preferably are from about 25 to 65 microns.

It has been found that the of the milled and classified powder do not form clusters with suitable properties to yield the product of the instant invention at commercially acceptable rates. The powder requires too much compaction to form structurally intact, loosely packed clusters. Hence, the ultimate product will be too dense or will lack proper color or adequate strength.

When colloidal particles are added to the powder, the powder will form a loosely packed cluster which holds together during further processing. Thus, a cluster may be formed which will ultimately result in a product having a proper density with suitable color and friability. Furthermore, it will be possible to process these clusters at high commercial rates. Suitable commercial rates are at least 400 pounds per hour, preferably at least 800 pounds per hour and more preferably at least 1,000 pounds per hour.

According to the present invention colloidal particles are added to the powder. The colloidal particles are colloidally ground roasted coffee milled to sizes of 5 to 25 microns and preferably 10 to 15 microns. The colloidal particles may contain up to about 14 wt % oil. The amount of colloidal particles should range from about 1 to 15 weight percent and preferably from 3 to 12 weight percent based on the weight of the powder. The colloidal particles are added to the spray dried powder before or after milling and thoroughly mixed in. Preferably the colloidal particles are added prior to milling wherein the colloidal particles act as a vehicle for dispersing the oil contained therein.

After the colloidal particles have been added to the powder it must be formed into cluster. It is desired to produce clusters having a regular shape. By regular shape it is meant substantially cubical, spherical or similarly shaped. Clusters may be formed by compaction which may be achieved by subjecting the powder to vibration. A vibratory trough or a vertical bin which vibrates can be used to produce the necessary forces for compaction. Increasing vibration forces effect an increase in compaction. Too much compaction yields a cluster well formed but very dense, while too little compaction will not allow the particle to hold together during processing. Since it is desired to make a product of low density, it is preferred only to operate at minimum compaction energy necessary to keep the powder together. A proper addition of colloidal particles allows the use of minimum compaction energy. Uniformity of the clusters is enhanced by passing the cluster through a vibratory formation screen. This screen produces uniformly sized clusters and smooths out the edges of the clusters. The screen size, amplitude of vibration, mesh size and wire diameter must be carefully matched to the throughput and cohesiveness of the powder to prevent breaking of the fragile clusters. Preferably the screen will vary from 6 to 12 mesh.

Furthermore, the screen will control the size of the clusters which suitably will range from about 800 to 2100 microns and preferably from about 900 to 1900 microns. The bulk density of the formed clusters will suitably be from about 0.5 to 0.9 gm/cc and preferably from 0.6 to 0.8 gm/cc.

Once the clusters are formed, it is necessary to fuse the surface of the clusters to produce the desired color and appearance and to minimize breakage during handling. Steam may be used to melt a thin film of the cluster surface which upon drying forms a strong crust. The crust thickness ranges from 5 to 30 microns and preferable from 10 to 15 microns. Furthermore, the amount of steam used will affect the color and density of the particle form. Using more steam results in a darker color and stronger product but a smaller and denser product.

The clusters are contacted with steam in a free-fall condition. The steam for agglomeration can be either saturated or superheated. The relative quantity of steam used simply must be sufficient to form the aforesaid crust only. Steam velocity should be such that it is insufficient to break the clusters once they are formed, and yet the amount of steam present must be sufficient to partially liquefy the exterior surface of the clusters without penetrating the interior core thereof. Suitable steam velocities are less than 50 ft/sec and preferably less than 40 ft/sec. Steam contact will produce an agglomerate wherein the exterior of the cluster is hardened and is of a darker color than the interior, the interior being of approximately the same color as the feed stock material undergoing clustering. Suitably the steam to powder ratio will vary from approximately 2:1 to 12:1.

After contact with the steam, the fused clusters are dried in an atomsphere which minimize possible cluster-to-cluster agglomeration. Such drying is suitably practiced in the lower section of a tower while the agglomerates are still in free-fall. A dryer air temperature (inlet) above 200° F. and below 450° F. will be common, typically 290°–400° F. inlet and an outlet temperature in the order of 200° F. Eventually, this material will further dry and cool by passing from the tower onto a vibrating trough at the discharge from the tower, as is well-known in the art.

After drying the agglomerates may be screened to remove undersized and oversized particles. The average size of the agglomerates of the present invention range from 800 to 1300 microns and preferably from 1,000 to 1,150 microns. Furthermore, the fused agglomerates will have a bulk density of from 0.20 to 0.28 grams per cc. and preferrably from 0.22 to 0.26 grams per cc. and are rapidly soluble in water. Up to 60% of the agglomerate may be undersized or oversized material which may be fed to the feedstock to the mill and co-milled with the spray-dried powder.

Approximately 5% of the agglomerate surface, will be lighter colored than the remainder resulting in a varied color or speckled appearance. This product speckling is due to the presence of some minor amounts of broken agglomerates formed by attrition throughout the process after steam agglomeration. As previously stated, the interior core of the agglomerate maintains its lighter color. Thus, an overall speckling will be produced because of the contrast of the darker particles represented by the fused outer crust and the lighter material representative of those agglomerates which are fractured.

As indicated previously, the agglomerate will possess a hardened value of less than eight, i.e. less than 8% fine produced during measurement. A hardness value of under eight would correlate to an agglomerate possessing a good mechanical strength both in the jar and during use by the consumer. Hardness value is arrived at by the following simple tests set forth in the aforesaid Rhodes patent; 100 grams of sample to be tested is first gently screened to remove fine particles below 36 mesh. The samples are then subjected to more intense vibration using a further screening for a standard time of five minutes, and a sieve analysis is carried out to determine the amount which passes through the 36 mesh sieve. The comparative hardness of the granule, which gives a measure of a particle mechanical strength is expressed as the percentage by weight which passed through the 36 mesh sieve in the second screening. As product hardness increases the hardness value decreases. A hardness value of 10 or more is considered to be unsatisfactory for subsequent handling and packaging operations. Products made by the process of the present invention have comparative hardness value generally of less than 8. Preferably the products made by the present invention will have a hardness value less than four.

The agglomerates of the present invention have a dark appearance which ranges from 17 to 24 Lumetron units. The color of the coffee composition is herein quantified in so-called Lumetron units which are a measure of the reflectance color of the agglomerated powder from a tristimulus light source. For this purpose, the powder is placed in a small flat dish and measurements are taken by a Photovolt Reflection meter manufactured by the Photovolt Corporation of New York and used as described in their brochure for Model 575, a Reflecting and Gloss meter. For the purposes of interpreting the figures quoted herein, commercial roasted and ground coffee powders normally available in the United States have a Lumetron value of from 45 to 70 units (light colors), whereas expresso type coffees have a Lumetron value of 20 to 30 units (dark colors) at similar particle sizes.

The following examples are presented to further illustrate this invention.

EXAMPLE I

An agglomerated instant coffee having a roast and ground appearance including a degree of speckling was produced by the following process. A feed stock material was prepared which had the following compositional makeup: 85% milled spray-dried powder product from 25% extract of an average particle size of 38 microns, 10% of unmilled like spray-dried powder having an average particles size of 142 microns, and 5% colloidal roast and ground coffee having a particle size of 17 microns. The feed stock material had a moisture content of approximately 3.9% overall. This feed stock material was put on a Syntron ® Brand Vibratory Feeder manufactured by FMC Corporation. The feed stock material had a bed depth on the horizontal vibratory feeder of less than 1 inch and a residence time on the unit of approximately 10–30 seconds, the variables of residence time and horizontal angle varying with size of the charge and the desired cluster size as well as mix formulation. The feed stock material, while on the vibratory feeder produced small clusters. Upon exiting the vibratory feeder, the clusters passed with free-fall through a screen which had openings which were approximately 6 mesh. After the over-sized clusters were sized by the screen, the thru-clusters were contacted with steam which was present in an amount of 3 to 1 steam to powder, the steam was of a temperature of approximately 185° to 190° F. at the contact point with the clusters which was approximately 1 inch from the steam jets. The velocity of the steam was such that individual clusters were directed in a stream into a tower at the dryer conditions specified heretofore, wherein they were allowed to fall without contacting each other and were dried. The instant agglomerated coffee produced had a bulk density of 0.25 grams per cc, a hardness of 7.7, a color of 21.5 Lumetron Units and a degree of speckling which added to the overall impression and appearance of roast and ground coffee.

EXAMPLE II

An agglomerated instant coffee was produced from a feed stock material which consisted of a blend of: 65% of milled spray-dried instant coffee recovered from 55% extract and having an average particles size of 45 microns; 25% of reseed, reseed being unmilled and having a particle size of approximately 56 microns, and 10% of colloidal roast and ground coffee having a particle size of approximately 12 microns. The feed stock material had an overall moisture content of approximately 4.3%, with each of the constituents having the following moisture; unmilled spray-dried powder 4.5%; reseed 2.8% and colloidal roast and ground coffee 2.9%. The feed stock material was introduced onto the horizontal vibrating feeder in a manner similar to that utilized in Example I. Thereafter, the clusters came in contact with steam at a steam to powder ratio of approximately 10:1. The velocity of the steam was insufficient to break up the clusters but was sufficient to produce a stream of clusters which were carried into a drying tower. The agglomerated instant coffee thus produced had a bulk density of approximately 0.23 gm/cc, a hardness of approximately 4, a color of approximately 20 Lumetron Units and a degree of speckling which contributed to the overall appearance of the agglomerate as being that of roasted and ground coffee.

EXAMPLE III

Spray-dried powder having a moisture content of about 2.94% was obtained by spray drying coffee extract containing about 40% solids. A mixture was prepared by adding 5% colloidal roasted and ground coffee having a particle size of 25 micron to 95% spray-dried coffee. The mixture was blended in a ribbon blender. The mixture was then airveyed and milled using a Bauermeister brand mill model No. UZU11. The mill operated at 3000 RPM and employed a 4 mm screen to produce a powder having an average particle size of about 48 micron. Then reseed at a 15% by weight level was added to the milled mixture. The powder was then gravity fed to a Siletta ® feeder manufactured by the Solids Flow Control Corporation. Next the powder was fed to a Syntron brand Vibrating Tray Feeder (Model BF2A) having a bed depth of from 1½" down to ¼". The residue time of the powder on the tray was about 5 to 15 seconds. The powder was discharged onto a 5 mesh screen vibrated by a Syntron brand activator (Model F152).

The clusters were then exposed to low velocity steam to fuse the outer surface of the cluster. The steam temperature was 250° F. and two nozzels were employed to introduce the steam. The steam velocity of the first nozzel was 26 ft/sec. The steam velocity of the second nozzel was 33 ft/sec. The steam to powder ratio was 2.3:1. The drying tower employed inlet air at 305° F. and the outlet air was 205° F. The dried powder was then screened through a 6/20 mesh Rotex brand screen.

The finished product had a density of 0.26 gms/cc., a hardness of 4.1, a color of 23.5 Lumetron, an average particle size of 1246 micron and a roasted and ground appearance.

EXAMPLE IV

In this Example the conditions of Example III were substantially employed except that the 5% colloidal roasted and ground coffee and 95% spray-dried coffee mixture was milled to an average particle size of about 60 microns. No reseed was used. The product formed was substantially similar to that in Example III.

We claim:

1. A process for producing an agglomerated instant coffee product having a roasted and ground appearance comprising;
   a. milling spray-dried instant coffee to produce a milled powder of an average particle size of 30 to 75 microns with a standard deviation of 35% to 75% wherein the spray-dried product is produced from extracts of 20 to 65% soluble solids;
   b. adding roasted coffee colloidal particles in an amount from 1 to 15 weight percent based on the weight of the powder to the powder so that it will flow and will bind together with slight compaction;
   c. compacting the colloidal particles and powder to form a loosely bound, structurally intact cluster from the colloidal particles and powder, said cluster have a size of about 800 to 2100 microns;
   d. fusing the outer surface of the cluster to a depth of from about 5 to 30 microns; and
   e. drying the fused clusters to produce an agglomerated instant coffee having a density of from 0.20 to 0.28 gms/cc, a hardnes value of less than 8 and a color of 17 to 24 Lumetron units.

2. A process according to claim 1 wherein the formed cluster has a regular shape.

3. A process according to claim 1 further comprising screening the dried clusters.

4. A process according to claim 1 wherein the agglomerates have an average size of from 800 to 1,300 microns.

5. A process according to claim 1 wherein the clusters are formed utilizing light vibrational compaction.

6. A process according to claim 1 wherein the colloidal particles are from 1 weight percent to 15 weight percent based on the weight of the milled powder.

7. A process according to claim 1 wherein the colloidal particles are from 3 weight percent to 12 weight percent based on the weight of the milled powder.

8. A process according to claim 1 wherein the colloidal particles have a size from 5 to 25 microns.

9. A process according to claim 1 wherein the colloidal particles have a size from 10 to 15 microns.

10. A process according to claim 1 wherein the outer surface of the cluster is fused to depth of from about 10 to 15 microns.

11. A process according to claim 1 wherein the cluster is fused employing low velocity or low turbulent steam.

12. A process according to claim 11 wherein the steam to powder ratio is from 2:1 to 12:1.

13. A process according to claim 3 wherein up to 60% undersized and oversized agglomerates are recycled to the spray-dried powder before milling.

14. A process according to claim 1 wherein the milled spray-dried powder is classified to a size standard deviation of 35% to 55%.

15. An agglomerated instant coffee product comprising spray-dried instant coffee and colloidal particles said product having a density of from 0.20 to 0.28 gm/cc, a hardness value of less than 8 and a color of 17 to 24 Lumetron units and produced by the process of claim 1.

16. A product according to claim 15 wherein the colloidal particles are from 1 to 15 weight percent.

17. A product according to claim 16 wherein the colloidal particles are from 3 to 12 weight percent.

18. A product according to claim 15 wherein the colloidal particles have a size of from 5 to 25 microns.

19. A product according to claim 15 wherein the product has an average size of from 800 to 1,300 microns.

20. A product according to claim 15 wherein the product has an average size of from 1,000 to 1,150 microns.

21. A process according to claim 1 wherein the fused cluster is air-dried employing inlet air at a temperature of between 200° F. and below 450° F.

* * * * *